(12) United States Patent
Togashi et al.

(10) Patent No.: US 7,199,996 B2
(45) Date of Patent: Apr. 3, 2007

(54) LAMINATED CAPACITOR

(75) Inventors: Masaaki Togashi, Tokyo (JP); Tatsuya Fukunaga, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/440,121

(22) Filed: May 25, 2006

(65) Prior Publication Data

US 2006/0279903 A1 Dec. 14, 2006

(30) Foreign Application Priority Data

Jun. 13, 2005 (JP) .............................. 2005-172974

(51) Int. Cl.
*H01G 4/005* (2006.01)
*H01G 4/06* (2006.01)
(52) U.S. Cl. ...................... 361/303; 361/311
(58) Field of Classification Search ........ 361/303–305, 361/311
See application file for complete search history.

(56) References Cited

U.S. PATENT DOCUMENTS 4,356,529 A * 10/1982 Kopel ........................ 361/304
7,046,500 B2 * 5/2006 Lee et al. .................... 361/303
7,085,124 B2 * 8/2006 Togashi ....................... 361/303
7,088,569 B1 * 8/2006 Togashi et al. .............. 361/303
2001/0055191 A1 * 12/2001 Naito et al. .................. 361/303
2003/0099083 A1 * 5/2003 Ohtsuka et al. ............. 361/303

FOREIGN PATENT DOCUMENTS

JP         1-206615         8/1989

* cited by examiner

*Primary Examiner*—Eric W. Thomas
(74) *Attorney, Agent, or Firm*—Oblon, Spivak, McClelland, Maier & Neustadt, P.C.

(57) ABSTRACT

A laminated capacitor includes a capacitor body and first, second, third and fourth external electrodes disposed on an external surface of the capacitor body. The capacitor body has first and second electrode patterns that are alternately laminated with dielectric layers between. The first electrode pattern provides a first internal electrode that is connected to both the first and second external electrodes. The second electrode pattern provides second and third internal electrodes. The second internal electrode is connected to both the third and fourth external electrodes. The third internal electrode is disposed in the same layer as the second internal electrode and connected to one of the third and fourth external electrodes.

10 Claims, 8 Drawing Sheets

Comparative example

# LAMINATED CAPACITOR

BACKGROUND OF THE INVENTION

1. Field of the Invention

The present invention relates to a laminated capacitor.

2. Description of the Related Art

In order to eliminate noise in a high-frequency band (for example, of 100 MHz or more), laminated capacitors to be used as a noise filter in IC power supply line are required to have excellent attenuation characteristics in such a high-frequency band.

Japanese Unexamined Patent Application Publication H01-206615 discloses a laminated feed-through capacitor with first and second external electrodes on laterally opposite sides of a dielectric substrate and with third and fourth external electrodes on longitudinally opposite sides of the dielectric substrate. Inside the dielectric substrate, moreover, first and second electrode patterns are alternately laminated with dielectric layers between. The first electrode pattern provides an internal electrode that is connected to both the first and second external electrodes. The second electrode pattern provides an internal electrode that is connected to both the third and fourth external electrodes.

In the laminated feed-through capacitor disclosed in JP H01-206615, however, the second electrode pattern does not provide any internal electrode other than the internal electrode connected to both the third and fourth external electrodes. In this construction, there is a limit to improving attenuation characteristics in a high-frequency band.

SUMMARY OF THE INVENTION

It is an object of the present invention to provide a laminated capacitor with improved attenuation characteristics in a high-frequency band.

To achieve the above-mentioned object, the present invention provides a laminated capacitor comprising a capacitor body and first, second, third and fourth external electrodes disposed on an external surface of the capacitor body.

The capacitor body has first and second electrode patterns that are alternately laminated with dielectric layers between. The first electrode pattern provides a first internal electrode that is connected to both the first and second external electrodes.

The second electrode pattern provides second and third internal electrodes. The second internal electrode is connected to both the third and fourth external electrodes, whereas the third internal electrode is disposed in the same layer as the second internal electrode and connected to one of the third and fourth external electrodes.

In the laminated capacitor according to the present invention, the capacitor body has the first and second electrode patterns that are alternately laminated with dielectric layers between. The first electrode pattern provides the first internal electrode that is connected to both the first and second external electrodes. The second electrode pattern provides the second internal electrode that is connected to both the third and fourth external electrodes. Thus, the first and second internal electrodes provide a basic structure of a feed-through capacitor.

The second electrode pattern further provides the third internal electrode. The third internal electrode is disposed in the same layer as the second internal electrode and connected to one of the third and fourth external electrodes. Thus, there is obtained a structure in which a normal capacitor constituted of the first and third internal electrodes is provided in addition to the feed-through capacitor. In terms of electrical circuit, there is obtained a multiple capacitor constituted of the feed-through capacitor and the normal capacitor. Accordingly, attenuation characteristics in a high-frequency band can be improved to eliminate noise in a high-frequency band.

Next there will be described preferred embodiments according to the present invention.

In one preferred embodiment, the second electrode pattern may further provide a fourth internal electrode that is disposed in the same layer as the second internal electrode and connected to the other of the third and fourth external electrodes. With this construction, a normal capacitor constituted of the first and fourth internal electrodes is provided in addition to the normal capacitor constituted of the first and third internal electrodes. In terms of electrical circuit, the third and fourth external electrodes are each provided with one normal capacitor. Accordingly, attenuation characteristics in a high-frequency band can be further improved to eliminate noise in a high-frequency band.

Preferably, the third and fourth internal electrodes are of equal electrode area.

In another preferred embodiment, the second electrode pattern may further provide a fifth internal electrode that is disposed in the same layer as the second internal electrode and connected to the same external electrode as the third internal electrode. With this construction, a normal capacitor constituted of the first and fifth internal electrodes is further provided to increase the number of normal capacitors. This can eliminate noise in a high-frequency band more effectively.

Preferably, the second electrode pattern may further provide a sixth internal electrode that is disposed in the same layer as the second internal electrode and connected to the same external electrode as the fourth internal electrode. With this construction, there is further provided a normal capacitor constituted of the first and sixth internal electrodes. Accordingly, the third and fourth external electrodes are each provided with two normal capacitors to eliminate noise in a high-frequency band more effectively.

More preferably, the third and fourth internal electrodes are of equal electrode area, and the fifth and sixth internal electrodes are of equal electrode area.

If desired, the third, fourth, fifth and sixth internal electrodes may be of equal electrode area.

In yet another preferred embodiment, the second internal electrode may include a meander pattern. With this construction, an inductance component by the meander pattern can be added, and in terms of electrical circuit, there is obtained a π-type filter circuit. This can eliminate noise in a high-frequency band more effectively.

In still another preferred embodiment, the second internal electrode may include a meander line and first and second sections. The first section may have one end connected to the third external electrode. The second section may have one end connected to the fourth external electrode. The other end of the second section may be connected to the other end of the first section through the meander line. With this construction, the inductance component by the meander line can be increased such that the meander line is narrowed while securing sufficient electrode area with the first and second sections.

In still another preferred embodiment, the capacitor body may have an end face facing in a length direction perpendicular to a lamination direction of the first and second electrode patterns. The second electrode pattern may provide a first connection electrode that is connected to both the second and third internal electrodes in a vicinity of the end face of the capacitor body and led to the end face of the capacitor body. With this construction, even if the external electrode disposed on the end face of the capacitor body (i.e., one of the third and fourth external electrodes) to be connected to the second and third internal electrodes has a considerably small electrode width as seen in a width direction of the capacitor body, the first connection electrode ensures good connection between the second and third internal electrodes and the external electrode.

As has been described hereinabove, the present invention can provide a laminated capacitor with improved attenuation characteristics in a high-frequency band.

The present invention will be more fully understood from the detailed description given hereinbelow and the accompanying drawings which are given by way of illustration only, and thus not to be considered as limiting the present invention.

DESCRIPTION OF THE PREFERRED EMBODIMENTS

Figure 1:
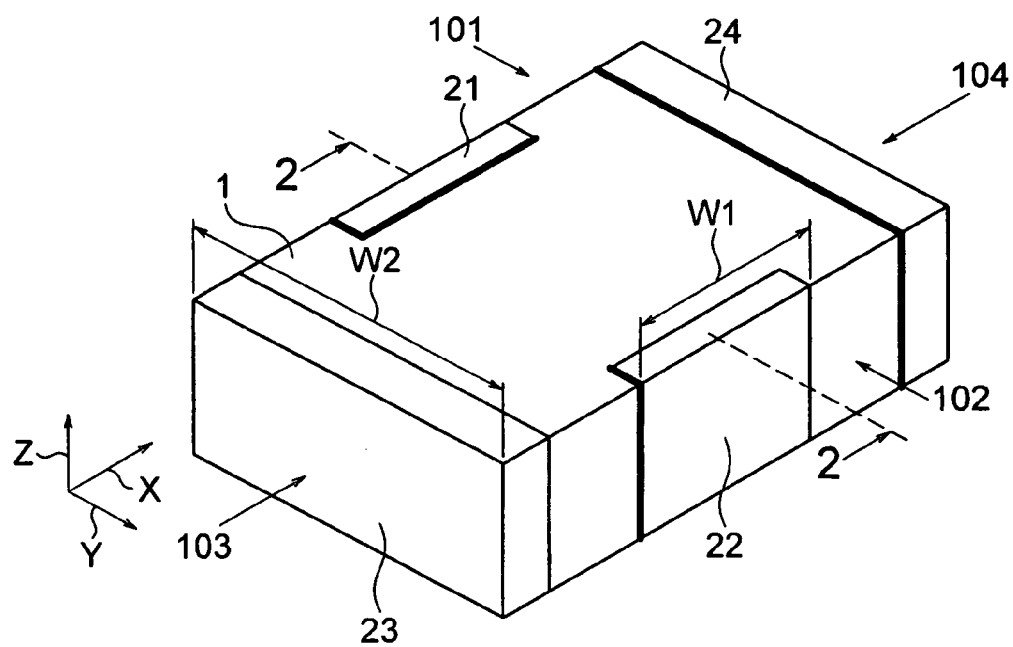
FIG. 1 is a perspective view showing a laminated capacitor according to one embodiment of the present invention.

Referring first to FIG. 1, a laminated capacitor according to one embodiment of the present invention comprises a capacitor body 1 and first to fourth external electrodes 21 to 24.

The capacitor body 1 is a generally rectangular solid defined by a length direction X, a width direction Y and a thickness direction Z, wherein end faces 103, 104 are opposed to each other in the length direction X and side faces 101, 102 are opposed to each other in the width direction Y.

The first to fourth external electrodes 21 to 24 are disposed on the external surface of the capacitor body 1. Specifically, first and second external electrodes 21, 22 are disposed on the side faces 101, 102 of the capacitor body 1; third and fourth external electrodes 23, 24 are disposed on the end faces 103, 104 of the capacitor body 1. Since the first and second external electrodes 21, 22 are symmetrically disposed and the third and fourth external electrodes 23, 24 are also symmetrically disposed, the second and third external electrodes 22, 23 will be described as representatives.

The third external electrode 23 is disposed over the end face 103 of the capacitor body 1 with an electrode width W2 in the width direction Y.

The fourth external electrode 24 is similarly disposed.

On the other hand, the second external electrode 22 is disposed on the side face 102 of the capacitor body 1 with an electrode width W1 in the length direction X. The second external electrode 22 is spaced apart from the third and fourth external electrodes 23, 24. The first external electrode 21 is similarly disposed.

In this embodiment, the electrode width W2 of the third and fourth external electrodes 23, 24 is set larger than the electrode width W1 of the first and second external electrodes 21, 22.

Figure 2:
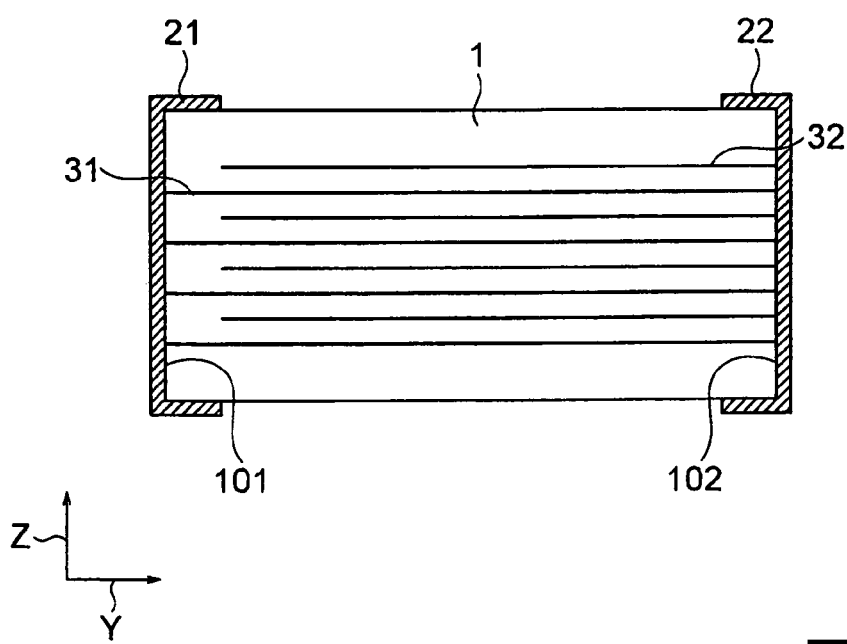
FIG. 2 is a schematic diagram showing a cross-section taken along line 2—2 of FIG. 1.

Referring now to FIG. 2, the capacitor body 1 has first and second electrode patterns 31, 32 that are alternately laminated with dielectric layers between. Specifically, the first and second electrode patterns 31, 32 are laminated in the thickness direction Z of the capacitor body 1 with dielectric layers between, wherein the number of layers (the total layer number of the first and second electrode patterns) may be 100 or more. The first and second electrode patterns 31, 32 may be made of Ni, and the dielectric layers may be made of a dielectric material containing barium titanate as a main component.

Figure 3:
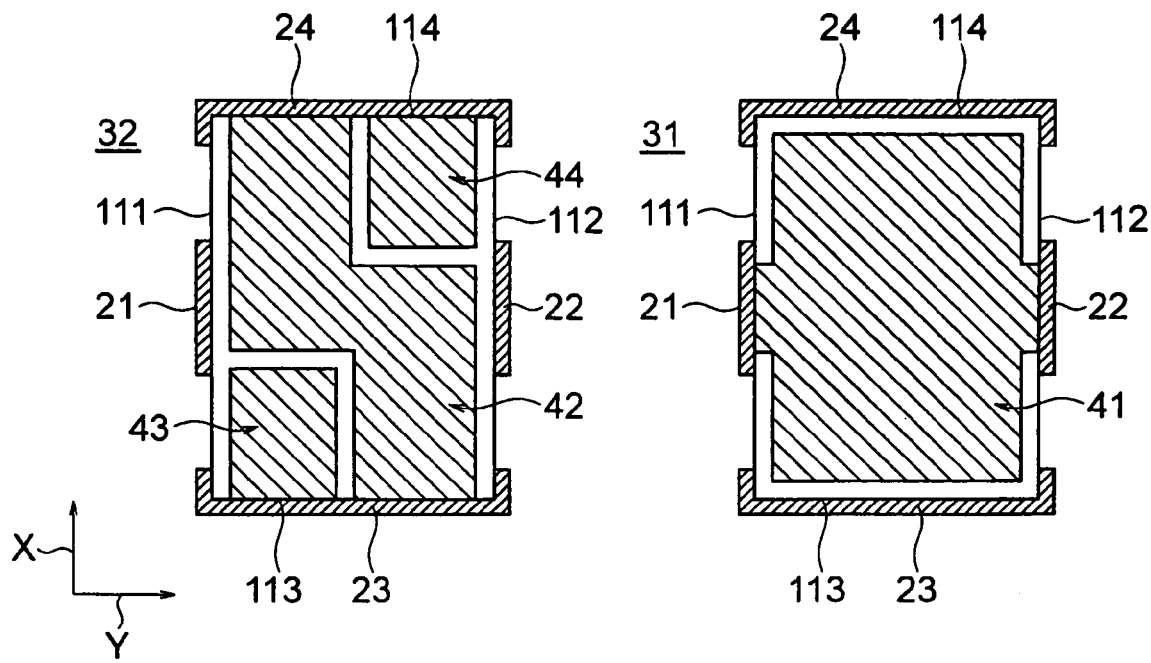
FIG. 3 is a diagram showing first and second electrode patterns in the laminated capacitor shown in FIGS. 1 and 2.

FIG. 3 is a diagram showing the first and second electrode patterns in the laminated capacitor shown in FIGS. 1 and 2. In FIG. 3, the capacitor body has two sides 113, 114 that are opposed to each other in the length direction X and two sides 111, 112 that are opposed to each other in the width direction Y.

The first electrode pattern 31 provides a first internal electrode 41. The first internal electrode 41 is connected to the first and second external electrodes 21, 22. Specifically, the first internal electrode 41 is in a generally rectangular shape defined by the length direction X and the width direction Y with lead-out elements on opposite sides in the width direction Y. These lead-out elements are led to the sides 111, 112 of the capacitor body 1 in the width direction Y and connected to the first and second external electrodes 21, 22. The first internal electrode 41 is not connected to the third and fourth external electrodes 23, 24.

On the other hand, the second electrode pattern 32 provides second, third and fourth internal electrodes 42, 43, 44. The second internal electrode 42 is connected to the third and fourth external electrodes 23, 24. Specifically, the second internal electrode 42 meanders from the corner of the sides 112,113 to the corner of the sides 111, 114 of the capacitor body. In addition, both ends of the meander pattern of the second internal electrode 42 are led to the sides 113, 114 of the capacitor body in the length direction X and connected to the third and fourth external electrodes 23, 24. The second internal electrode 42 is not connected to the first and second external electrodes 21, 22.

The third internal electrode 43 is disposed in the same layer as the second internal electrode 42 and connected to the third external electrode 23. Specifically, the third internal electrode 43 is disposed at the corner of the sides 111, 113 of the capacitor body while being spaced apart from the second internal electrode 42 of the meander pattern. In addition, one end of the third internal electrode 43 is led to the side 113 of the capacitor body in the length direction X and connected to the third external electrode 23. The third internal electrode 43 is not connected to the first, second and fourth external electrodes 21, 22, 24.

The fourth internal electrode 44 is disposed in the same layer as the second internal electrode 42 and connected to the fourth external electrode 24. Specifically, the fourth internal electrode 44 is disposed at the corner of the sides 112, 114 of the capacitor body while being spaced apart from the second internal electrode 42 of the meander pattern. In addition, one end of the fourth internal electrode 44 is led to the side 114 of the capacitor body in the length direction X and connected to the fourth external electrode 24. The fourth internal electrode 44 is not connected to the first, second and third external electrodes 21, 22, 23.

As described above with reference to FIGS. 2 and 3, the capacitor body 1 has the first and second electrode patterns 31, 32 that are alternately laminated with dielectric layers between. The first electrode pattern 31 provides the first internal electrode 41 that is connected to both the first and second external electrodes 21, 22. The second electrode pattern 32 provides the second internal electrode 42 that is connected to both the third and fourth external electrodes 23, 24. Thus, the first and second internal electrodes 41, 42 provide a basic structure of a feed-through capacitor.

The second electrode pattern 32 further provides the third internal electrode 43. The third internal electrode 43 is disposed in the same layer as the second internal electrode 42 and connected to one of the third and fourth external electrodes 23, 24, i.e., the third external embodiment 23. Thus, there is obtained a structure in which a normal capacitor constituted of the first and third internal electrodes 41, 43 is provided in addition to the feed-through capacitor.

Figure 4:
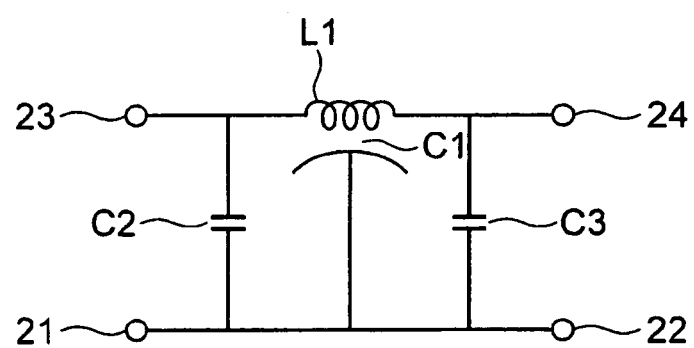
FIG. 4 is an electrical diagram of the laminated capacitor shown in FIGS. 1 to 3.

FIG. 4 is an electrical diagram of the laminated capacitor shown in FIGS. 1 to 3. The first and second internal electrodes 41, 42 constitute a feed-through capacitor C1 between the third and fourth external electrodes 23, 24. The first and third internal electrodes 41, 43 constitute a normal capacitor C2 on the side of the third external electrode 23 with respect to the feed-through capacitor C1. Thus, there is obtained a multiple capacitor constituted of the feed-through capacitor C1 and the normal capacitor C2. Accordingly, attenuation characteristics in a high-frequency band can be improved to eliminate noise in a high-frequency band.

As described above with reference to FIG. 3, the second electrode pattern 31 further provides the fourth internal electrode 44 that is disposed in the same layer as the second internal electrode 42 and connected to the other of the third and fourth external electrodes 23, 24, i.e., the fourth external electrode 24. With this construction, a normal capacitor constituted of the first and fourth internal electrodes 41, 44 is provided in addition to the normal capacitor constituted of the first and third internal electrodes 41, 43. Specifically, as shown in FIG. 4, a normal capacitor C3 constituted of the first and fourth internal electrodes 41, 44 is provided on the side of the fourth external electrode 24 with respect to the feed-through capacitor C1. Thus, the normal capacitors C2, C3 are provided on the sides of the third and fourth external electrodes 23, 24, respectively, thereby eliminating noise in a high-frequency band more effectively.

As described above with reference to FIG. 3, moreover, the second internal electrode 42 includes the meander pattern. With this construction, as shown in FIG. 4, an inductance component L1 by the meander pattern is added to the feed-through capacitor C1, whereby a π-type filter circuit can be obtained. This can eliminate noise in a high-frequency band more effectively.

Referring further to FIG. 3, the third and fourth internal electrodes 43, 44 are of equal electrode area. With this construction, the normal capacitor C2 constituted of the first and third internal electrodes 41, 43 and the normal capacitor C3 constituted of the first and fourth internal electrodes 41, 44 may be of equal capacitance (see FIG. 4). Accordingly, the laminated capacitor can be mounted on a circuit board or the like regardless of the orientation of the third and fourth external electrodes 23, 24.

Next, attenuation characteristics will be concretely described with reference to experimental data for Example and Comparative Examples.

EXAMPLE 1

For Example 1, a laminated capacitor was prepared as described above with reference to FIGS. 1 to 3. Detailed design values were as follows. External dimensions: 2.0 mm (L)×1.0 mm (W)×1.25 mm (H) (which were measured in the length direction X, the width direction Y, and the thickness direction Z, respectively)

The number of layers: 130

(which was the total layer number of the first and second electrode patterns)

Capacitance of the feed-through capacitor C1: 1.5 μF

Capacitance of the normal capacitor C2: 1.0 μF

Capacitance of the normal capacitor C3: 1.0 μl F

COMPARATIVE EXAMPLE 1

Figure 5:
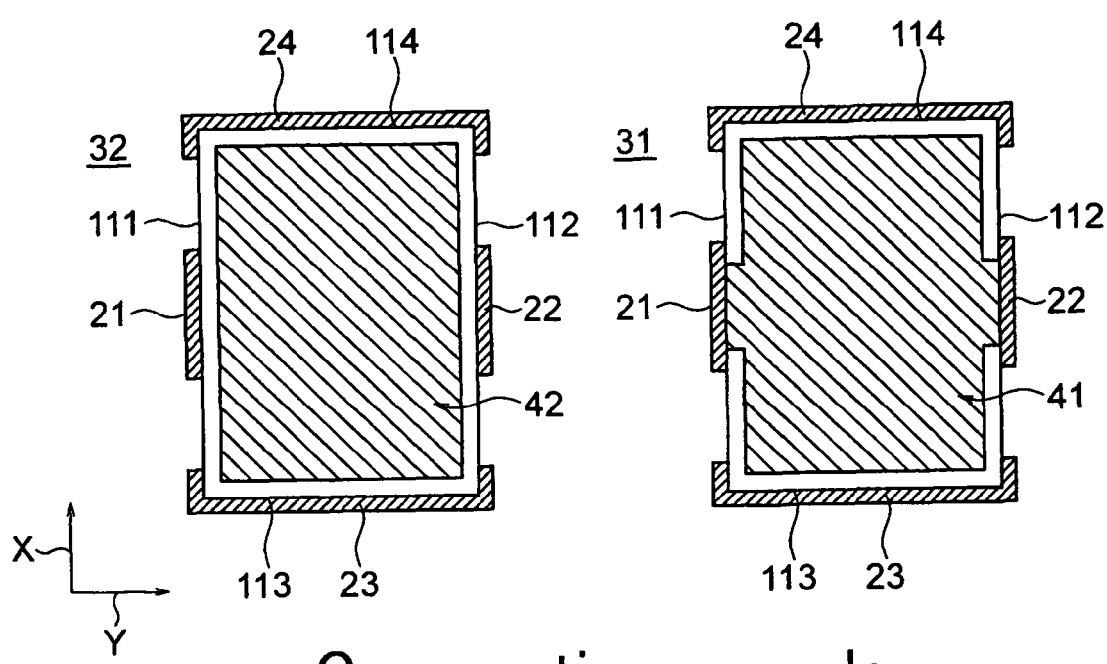
FIG. 5 is a diagram showing first and second electrode patterns in a laminated capacitor of Comparative Example 1.

For Comparative Example 1, a laminated capacitor was prepared as shown in FIG. 5. In FIG. 5, the components similar to those of FIGS. 1 to 3 are designated by the same reference numerals. In the laminated capacitor of Comparative Example 1, the second electrode pattern 32 had only the internal electrode 42 connected to both the third and fourth external electrodes 23, 24. There was no other internal electrode. For the rest, the laminated capacitor of Comparative Example 1 was similar to the laminated capacitor of Example 1.

Figure 6:
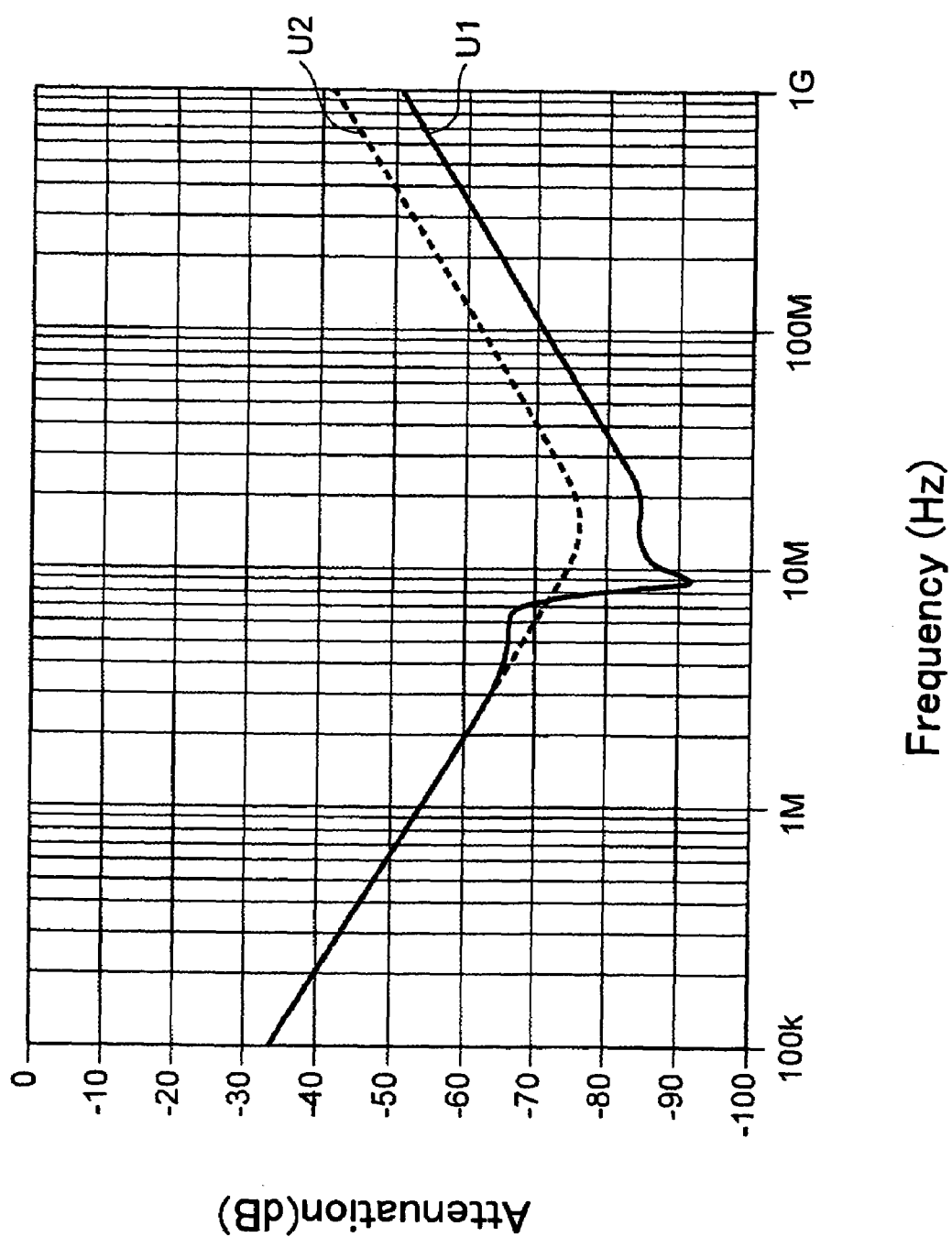
FIG. 6 is a diagram showing attenuation characteristics for Example 1 and Comparative Example 1.

FIG. 6 is diagram showing attenuation characteristics for Example 1 and Comparative Example 1. In FIG. 6, the axis of abscissa represents frequency (Hz), and the axis of ordinate represents attenuation (dB). The curve U1 represents attenuation characteristics for the laminated capacitor of Example 1, and the curve U2 represents attenuation characteristics for the laminated capacitor of Comparative Example 1. Referring to the curves U1, U2, it is seen that the laminated capacitor of Example 1 has excellent attenuation characteristics in a high-frequency band, for example, of 100 MHz or more, as compared with the laminated capacitor of Comparative Example 1.

Figure 7:
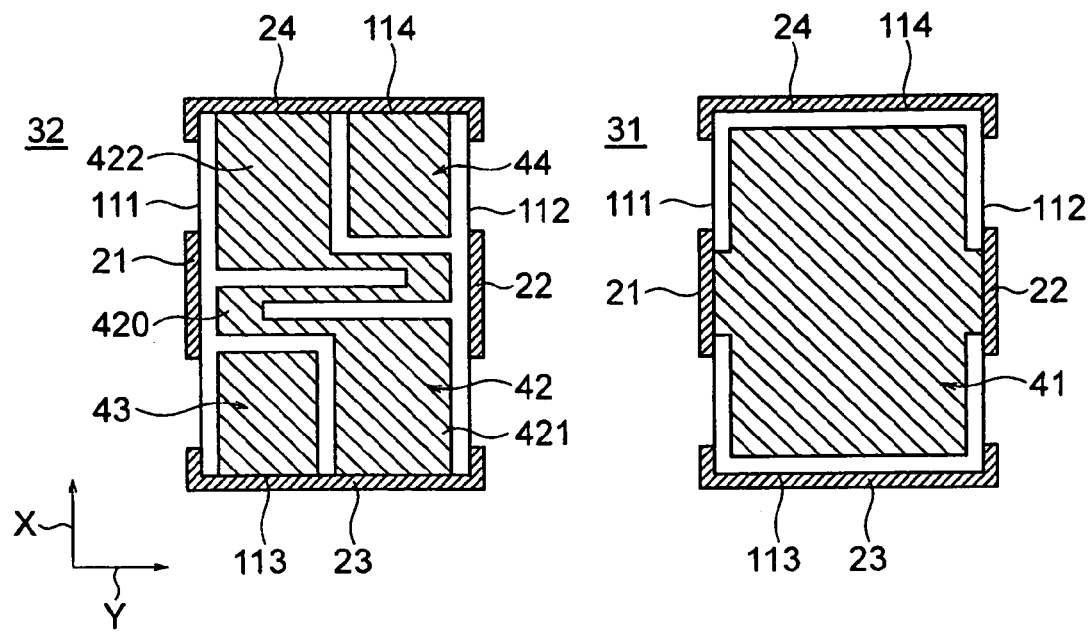
FIG. 7 is a diagram showing first and second electrode patterns in a laminated capacitor according to another embodiment of the present invention.

FIG. 7 is diagram showing first and second electrode patterns in a laminated capacitor according to another embodiment of the present invention. In FIG. 7, the components similar to those of FIGS. 1 to 3 are designated by the same reference numerals, and a duplicate description will be omitted.

In contrast with the first embodiment shown in FIGS. 1 to 3, the second internal electrode 42 of the second embodiment includes a meander line 420 and first and second sections 421, 422. The first section 421 is disposed at the corner of the sides 112, 113 of the capacitor body and has one end connected to the third external electrode 23.

The meander line 420 is constituted of at least one fold and a plurality of linear portions connected one another through the fold. Although two folds are shown in FIG. 7, the meander line 420 may have any number of folds, e.g., one or three or more.

The second section 422 is disposed at the corner of the sides 111, 114 of the capacitor body and has one end connected to the fourth external electrode 24. The other end of the second section 422 is connected to the other end of the first section 421 through the meander line 420.

As described above with reference to FIG. 7, the first section 421 of the second internal electrode 42 has one end connected to the third external electrode 23. The second section 422 has one end connected to the fourth external electrode 24 and the other end connected to the other end of the first section 421 through the meander line 420. With this construction, the inductance component by the meander line 420 can be increased such that the meander line 420 is narrowed while securing sufficient electrode area with the first and second sections 421, 422.

Figure 8:
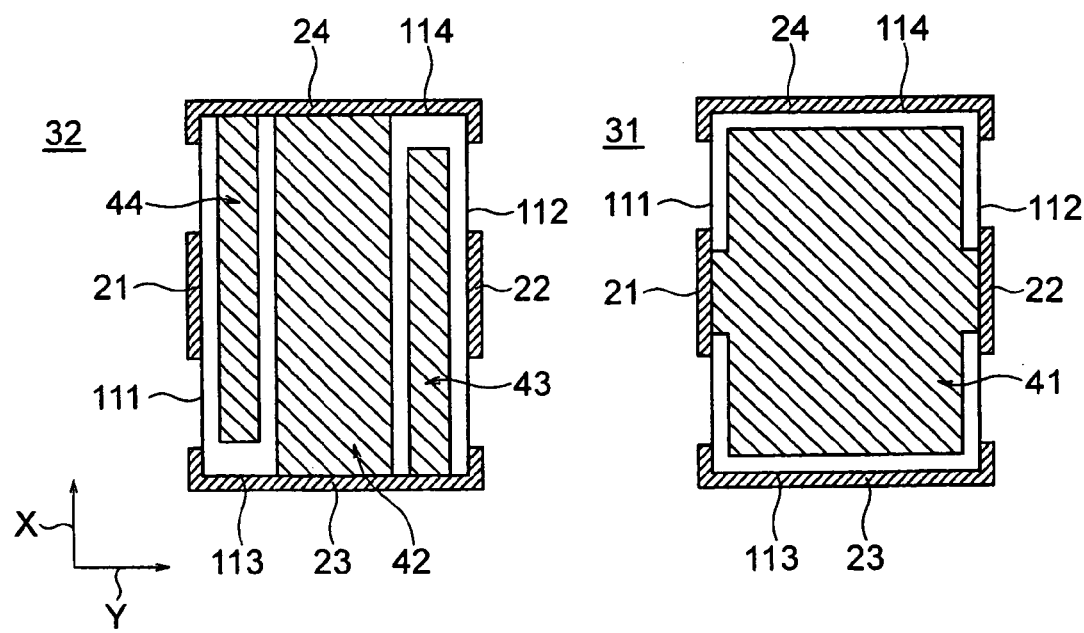
FIG. 8 is a diagram showing first and second electrode patterns in a laminated capacitor according to yet another embodiment of the present invention.

FIG. 8 is diagram showing first and second electrode patterns in a laminated capacitor according to yet another embodiment of the present invention. In FIG. 8, the components similar to those of FIGS. 1 to 3 are designated by the same reference numerals, and a duplicate description will be omitted.

In contrast with the first embodiment shown in FIGS. 1 to 3, the second internal electrode 42 of the third embodiment extends linearly from the side 113 to the side 114 of the capacitor body along the length direction X. Specifically, the second internal electrode 42 is in a rectangular shape defined by the length direction X and the width direction Y, wherein both ends in the length direction X are led to the sides 113, 114 of the capacitor body and connected to the third and fourth external electrodes 23, 24.

The third internal electrode 43 is disposed along the side 112 of the capacitor body while being spaced apart from the second internal electrode 42 in the width direction Y. One end of the third internal electrode 43 in the length direction X is led to the side 113 of the capacitor body and connected to the third external electrode 23, while the other end is spaced apart from the side 114 of the capacitor body.

The fourth internal electrode 44 is disposed along the side 111 of the capacitor body while being spaced apart from the second internal electrode 42 in the width direction Y. One end of the fourth internal electrode 44 in the length direction X is led to the side 114 of the capacitor body and connected to the fourth external electrode 24, while the other end is spaced apart from the side 113 of the capacitor body.

Figure 9:
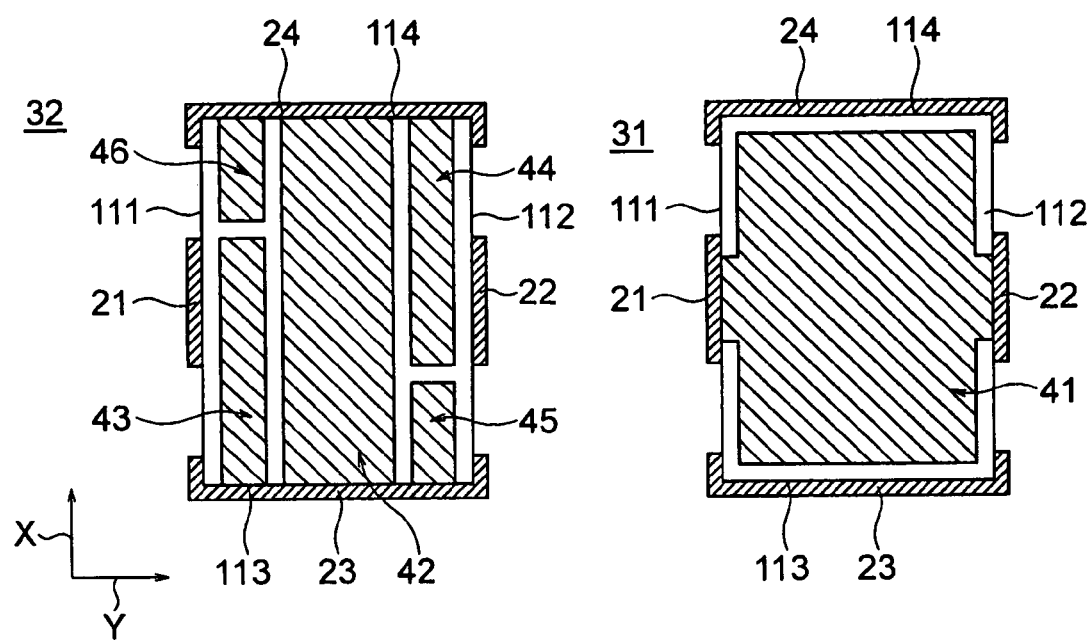
FIG. 9 is a diagram showing first and second electrode patterns in a laminated capacitor according to still another embodiment of the present invention.

FIG. 9 is diagram showing first and second electrode patterns in a laminated capacitor according to still another embodiment of the present invention. In FIG. 9, the components similar to those of FIG. 8 are designated by the same reference numerals, and a duplicate description will be omitted.

In contrast with the third embodiment shown in FIG. 8, the second electrode pattern 32 of the fourth embodiment further provides fifth and sixth internal electrodes 45, 46.

The fifth internal electrode 45 is disposed in the same layer as the second internal electrode 42 and connected to the same external electrode as the third internal electrode 43, i.e., connected to the third external electrode 23. Specifically, the fifth internal electrode 45 is disposed along the side 112 of the capacitor body while being spaced apart from the second internal electrode 42 in the width direction Y. That is, the fifth internal electrode 45 is disposed opposite the third internal electrode 43 with the second internal electrode 42 between. The fifth internal electrode 45 is not connected to the first, second and fourth external electrodes 21, 22, 24.

The sixth internal electrode 46 is disposed in the same layer as the second internal electrode 42 and connected to the same external electrode as the fourth internal electrode 44, i.e., connected to the fourth external electrode 24. Specifically, the sixth internal electrode 46 is disposed along the side 111 of the capacitor body while being spaced apart from the second internal electrode 42 in the width direction Y. That is, the sixth internal electrode 46 is disposed opposite the fourth internal electrode 44 with the second internal electrode 42 between. The sixth internal electrode 46 is not connected to the first, second and third external electrodes 21, 22, 23.

As described above with reference to FIG. 9, the second electrode pattern 32 further provides the fifth and sixth internal electrodes 45, 46. The fifth internal electrode 45 is disposed in the same layer as the second internal electrode 42 and connected to the same external electrode as the third internal electrode 43, i.e., connected to the third external electrode 23. The sixth internal electrode 46 is disposed in the same layer as the second internal electrode 42 and connected to the same external electrode as the fourth internal electrode 44, i.e., connected to the fourth external electrode 24. This further provides a normal capacitor constituted of the first and fifth internal electrodes 41, 45 and a normal capacitor constituted of the first and sixth internal electrodes 41, 46.

Figure 10:
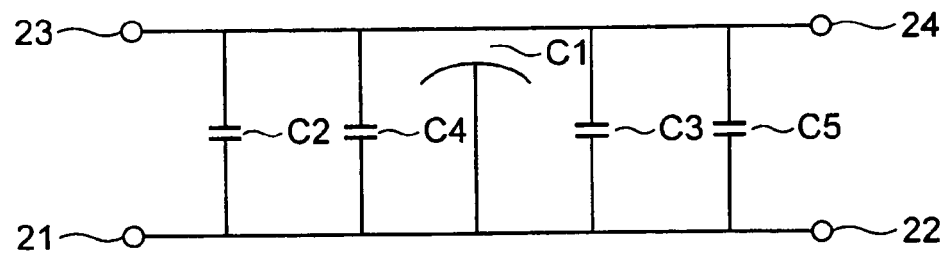
FIG. 10 is an electrical diagram of the laminated capacitor shown in FIG. 9.

FIG. 10 is an electrical diagram of the laminated capacitor shown in FIG. 9. A normal capacitor C4 constituted of the first and fifth internal electrodes 41, 45 is provided on the side of the third external electrode 23 with respect to the feed-through capacitor C1, i.e., provided on the same side as the normal capacitor C2. A normal capacitor C5 constituted of the first and sixth internal electrodes 41, 46 is provided on the side of the fourth external electrode 24 with respect to the feed-through capacitor C1, i.e., provided on the same side as the normal capacitor C3. Accordingly, the third and fourth external electrodes 23, 24 are each provided with two normal capacitors to eliminate noise in a high-frequency band more effectively.

Referring further to FIG. 9, the third and fourth internal electrodes 43, 44 are of equal electrode area, and the fifth and sixth internal electrodes 45, 46 are of equal electrode area. With this construction, the total capacitance of the two normal capacitors C2, C4 provided on the third external electrode 23 may be set equal to the total capacitance of the two normal capacitors C3, C5 provided on the fourth external electrode 24 (see FIG. 10). Accordingly, the laminated capacitor can be mounted on a circuit board or the like regardless of the orientation of the third and fourth external electrodes 23, 24.

In the illustrated fourth embodiment, the third internal electrode 43 (the fourth internal electrode 44) and the fifth internal electrode 45 (the sixth internal electrode 46) are of different electrode areas, but all the third to sixth internal electrodes 43 to 46 may be of equal electrode area.

Figure 11:
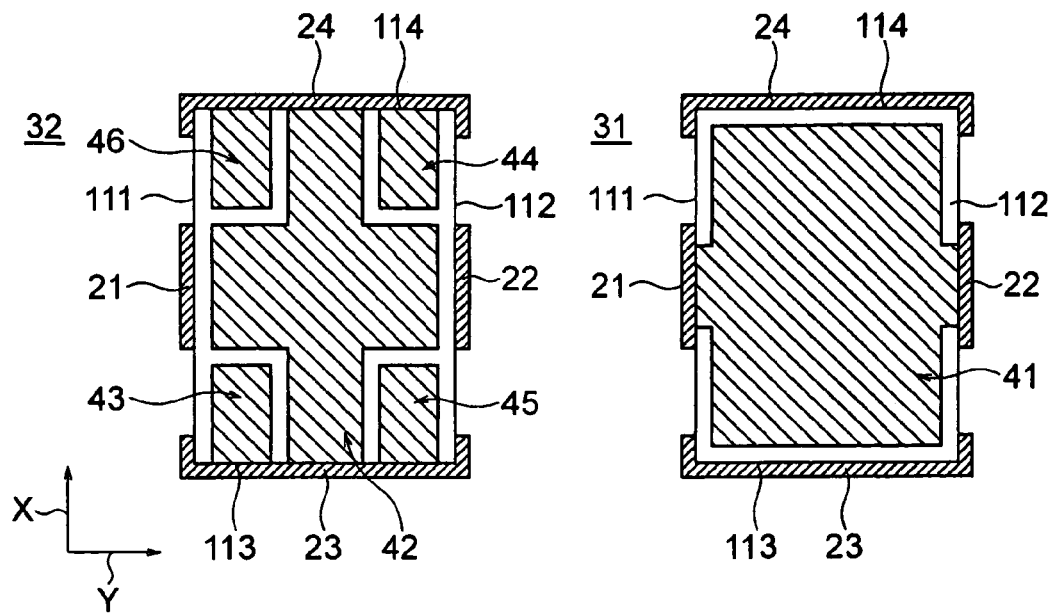
FIG. 11 is a diagram showing first and second electrode patterns in a laminated capacitor according to still another embodiment of the present invention.

FIG. 11 is diagram showing first and second electrode patterns in a laminated capacitor according to still another embodiment of the present invention. In FIG. 11, the components similar to those of FIG. 9 are designated by the same reference numerals, and a duplicate description will be omitted.

In contrast with the fourth embodiment shown in FIG. 9, the second internal electrode 42 of the fifth embodiment is in a cross shape defined by the length direction X and the width direction Y. Both ends of the second internal electrode 42 in the length direction X are led to the sides 113, 114 of the capacitor body and connected to the third and fourth external electrodes 23, 24. Both ends of the second internal electrode 42 in the width direction Y are spaced apart from the sides 111, 112 of the capacitor body and not connected to the first and second external electrodes 21, 22 disposed along the sides 111, 112.

The third internal electrode 43 is disposed at the corner of the sides 111, 113 of the capacitor body while being spaced apart from the second internal electrode 42 of the cross shape. The fourth to sixth internal electrodes 44 to 46 are similarly disposed. That is, the fourth, fifth and sixth internal electrodes 44, 45, 46 are disposed at the corner of the sides 112, 114, the corner of the sides 112, 113, and the corner of the sides 111, 114, respectively, while being spaced apart from the second internal electrode 42 of the cross shape.

The laminated capacitor of the fifth embodiment has the same electrical circuit as the laminated capacitor of FIG. 9 and will be described with reference to the electrical diagram of FIG. 10.

Referring again to FIG. 11, in the laminated capacitor of the fifth embodiment, the third to sixth internal electrodes 43 to 46 are of equal electrode area. With this construction, the normal capacitor C2 constituted of the first and third internal electrodes 41, 43, the normal capacitor C3 constituted of the first and fourth internal electrodes 41, 44, the normal capacitor C4 constituted of the first and fifth internal electrodes 41, 45 and the normal capacitor C5 constituted of the first and sixth internal electrodes 41, 46 may be of equal capacitance (see FIG. 10). Accordingly, the laminated capacitor can be mounted on a circuit board or the like regardless of the orientation of the third and fourth external electrodes 23, 24.

Figure 12:
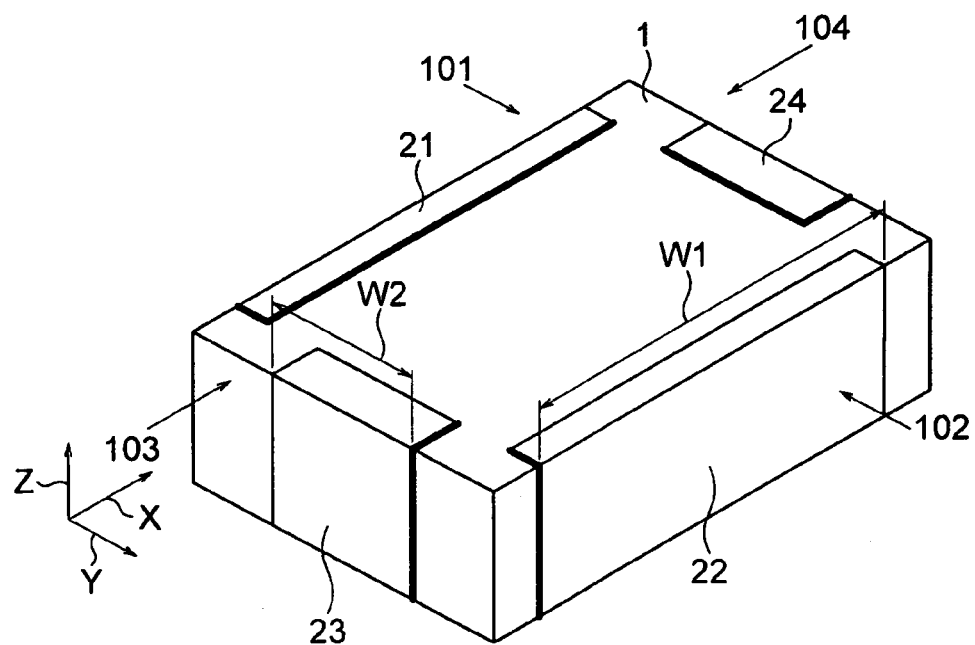
FIG. 12 is a perspective view showing a laminated capacitor according to still another embodiment of the present invention.
Figure 13:
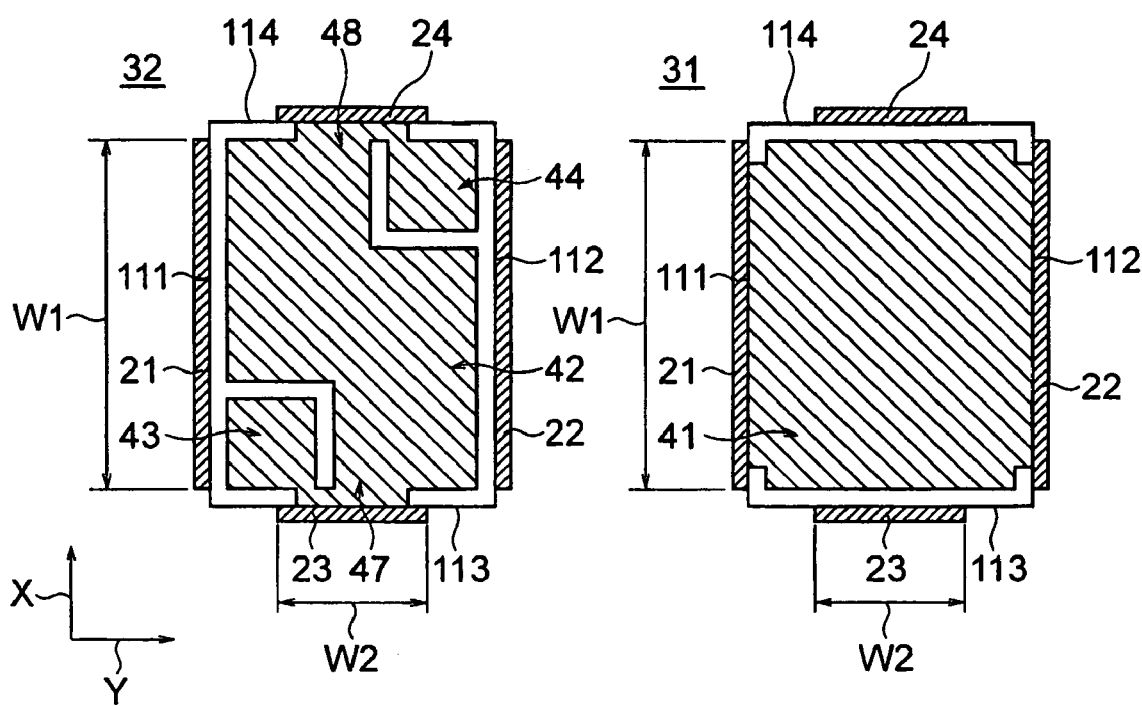
FIG. 13 is a diagram showing first and second electrode patterns in the laminated capacitor shown in FIG. 12.

FIG. 12 is a perspective view showing a laminated capacitor according to still another embodiment of the present invention, and FIG. 13 is a diagram showing first and second electrode patterns in the laminated capacitor shown in FIG. 12. In FIGS. 12 and 13, the components similar to those of FIGS. 1 to 3 are designated by the same reference numerals, and a duplicate description will be omitted.

Referring first to FIG. 12, the first and second external electrodes 21, 22 are disposed on the side faces 101, 102 of the capacitor body 1; the third and fourth external electrodes 23, 24 are disposed on the end faces 103, 104 of the capacitor body 1. In the sixth embodiment, the electrode width W1 of the first and second external electrodes 21, 22 is set to a relatively large value. Specifically, the electrode width W1 of the first and second external electrodes 21, 22 is larger than the electrode width W2 of the third and fourth external electrodes 23, 24.

Referring further to FIG. 13, the first internal electrode 41 has lead-out elements on opposite sides in the width direction Y. These lead-out elements are led to the sides 111, 112 of the capacitor body in the width direction Y and connected to the first and second external electrodes 21, 22. In the sixth embodiment, the lead-out elements of the first internal electrode 41 are of relatively large width in the length direction X. This reduces the inductance value of the first internal electrode 41. Accordingly, the laminated capacitor can be provided with low ESL (equivalent series inductance) in respect of the first and second external electrodes 21, 22.

From the viewpoint of lowering ESL in respect of the first and second external electrodes 21, 22, the electrode width W1 of the first and second external electrodes 21, 22 is preferably set to a relatively large value.

However, since there are limits to the external size of the capacitor body 1, the electrode width W2 of the third and fourth external electrodes 23, 24 will be decreased by setting the electrode width W1 of the first and second external electrodes 21, 22 to a relatively large value. Decreasing the width of the external electrode may impair connectivity to the internal electrodes. For example, decreasing the width of the third external electrode 23 may impair connectivity to the second and third internal electrodes 42, 43.

Therefore, it is required to ensure good connection between the second and third internal electrodes 42, 43 and the third external electrode 23 even when the electrode with W2 of the third external electrode 23 is small.

Referring to FIG. 13, the second electrode pattern 32 provides a first connection electrode 47. The first connection electrode 47 is connected to both the second and third internal electrodes 42, 43 in the vicinity of the side 113 of the capacitor body and led to the side 113 of the capacitor body. In other words, the first connection electrode 47 is connected to both the second and third internal electrodes 42, 43 in the vicinity of the end face 103 (see FIG. 12) of the capacitor body and led to the end face 103 of the capacitor body. With this construction, even if the external electrode disposed on the end face 103 of the capacitor body (i.e., the third external electrode 23) to be connected to the second and third internal electrodes 42, 43 has a considerably small electrode width W2 as seen in the width direction Y of the capacitor body 1, the first connection electrode 47 ensures good connection between the second and third internal electrodes 42, 43 and the external electrode 23.

The second electrode pattern 32 also provides a second connection electrode 48. The second connection electrode 48 is connected to both the second and fourth internal electrodes 42, 44 in the vicinity of the side 114 of the capacitor body and led to the side 114 of the capacitor body. Since second connection electrode 48 is similar to the first connection electrode 47, a duplicate description will be omitted.

The terminal connection structure adopting the above described connection electrode is also applicable to the second electrode patterns according to the foregoing embodiments (see FIGS. 3, 7, 8, 9, 11).

In addition, the second electrode patterns according to the individual embodiments (see FIGS. 3, 7, 8, 9, 11, 13) may be reversed about a central axis along the length direction X or the width direction Y.

While the present invention has been particularly shown and described with reference to embodiments thereof, it will be understood by those skilled in the art that various changes in form and detail may be made therein without departing from the spirit, scope and teaching of the invention.

What is claimed is:

1. A laminated capacitor comprising a capacitor body and first, second, third and fourth external electrodes disposed on an external surface of said capacitor body, said capacitor body having first and second electrode patterns that are alternately laminated with dielectric layers between, said first electrode pattern providing a first internal electrode that is connected to both said first and second external electrodes, said second electrode pattern providing second and third internal electrodes, said second internal electrode being connected to both said third and fourth external electrodes, said third internal electrode being disposed in the same layer as said second internal electrode and connected to one of said third and fourth external electrodes.

2. The laminated capacitor of claim 1, wherein said second electrode pattern provides a fourth internal electrode that is disposed in the same layer as said second internal electrode and connected to the other of said third and fourth external electrodes.

3. The laminated capacitor of claim 2, wherein said third and fourth internal electrodes are of equal electrode area.

4. The laminated capacitor of claim 2, wherein said second electrode pattern provides a fifth internal electrode that is disposed in the same layer as said second internal electrode and connected to the same external electrode as said third internal electrode.

5. The laminated capacitor of claim 4, wherein said second electrode pattern provides a sixth internal electrode that is disposed in the same layer as said second internal electrode and connected to the same external electrode as said fourth internal electrode.

6. The laminated capacitor of claim 5, wherein said third and fourth internal electrodes are of equal electrode area, and said fifth and sixth internal electrodes are of equal electrode area.

7. The laminated capacitor of claim 5, wherein said third, fourth, fifth and sixth internal electrodes are of equal electrode area.

8. The laminated capacitor of claim 1, wherein said second internal electrode includes a meander pattern.

9. The laminated capacitor of claim 1, wherein said second internal electrode includes a meander line and first and second sections, wherein said first section has one end connected to said third external electrode, said second section has one end connected to said fourth external electrode, the other end of said second section is connected to the other end of said first section through said meander line.

10. The laminated capacitor of claim 1, wherein said capacitor body has an end face facing in a length direction perpendicular to a lamination direction of said first and second electrode patterns, wherein said second electrode pattern provides a first connection electrode that is connected to both said second and third internal electrodes in a vicinity of said end face of said capacitor body and led to said end face of said capacitor body.

* * * * *